(12) United States Patent
Tanaka

(10) Patent No.: US 11,796,900 B2
(45) Date of Patent: Oct. 24, 2023

(54) LIGHT SOURCE DEVICE AND IMAGE DISPLAY DEVICE

(71) Applicant: SONY GROUP CORPORATION, Tokyo (JP)

(72) Inventor: Masa Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/413,640

(22) PCT Filed: Dec. 5, 2019

(86) PCT No.: PCT/JP2019/047571
§ 371 (c)(1),
(2) Date: Jun. 14, 2021

(87) PCT Pub. No.: WO2020/144983
PCT Pub. Date: Jul. 16, 2020

(65) Prior Publication Data
US 2022/0075248 A1    Mar. 10, 2022

(30) Foreign Application Priority Data
Jan. 7, 2019    (JP) .................................. 2019-000653

(51) Int. Cl.
*G03B 21/20*    (2006.01)
*G02B 27/14*    (2006.01)
(Continued)

(52) U.S. Cl.
CPC ....... *G03B 21/2013* (2013.01); *G02B 27/141* (2013.01); *G02B 27/283* (2013.01);
(Continued)

(58) Field of Classification Search
CPC ............. G03B 21/2013; G03B 21/204; G02B 27/141; G02B 27/283; H04N 9/3161; H04N 9/3164
(Continued)

(56) References Cited

U.S. PATENT DOCUMENTS

2002/0140905 A1    10/2002    Ouchi et al.
2004/0263500 A1    12/2004    Sakata
(Continued)

FOREIGN PATENT DOCUMENTS

JP    2001-264522    9/2001
JP    2003-185973    7/2003
(Continued)

OTHER PUBLICATIONS

International Search Report prepared by the Japan Patent Office dated Feb. 19, 2020, for International Application No. PCT/JP2019/047571.

(Continued)

*Primary Examiner* — Jerry L Brooks
(74) *Attorney, Agent, or Firm* — SHERIDAN ROSS P.C.

(57) ABSTRACT

A light source device and an image display device that combine light with high efficiency are provided. The light source device includes a first light source unit, a first illumination optical system that emits a first illumination light, a second light source unit, a second illumination optical system that emits a second illumination light, and a combiner on which the first illumination light and the second illumination light are incident. The combiner filters the incident light on the basis of a wavelength range and an incident angle, and angles at which the first illumination light and the second illumination light are incident on the combiner are each adjusted in such a way that the wavelength range of the first illumination light emitted from the (Continued)

combiner and the wavelength range of the second illumination light emitted from the combiner approach or overlap with each other.

20 Claims, 5 Drawing Sheets

(51) Int. Cl.
  *G02B 27/28* (2006.01)
  *H04N 9/31* (2006.01)
(52) U.S. Cl.
  CPC ......... *G03B 21/204* (2013.01); *H04N 9/3161* (2013.01); *H04N 9/3164* (2013.01)
(58) Field of Classification Search
  USPC .......................................................... 353/20
  See application file for complete search history.

(56) References Cited

U.S. PATENT DOCUMENTS

| | | | |
|---|---|---|---|
| 2006/0164857 A1* | 7/2006 | Morejon | H04N 9/315 |
| | | | 362/555 |
| 2007/0133631 A1 | 6/2007 | Ushigome et al. | |
| 2008/0007695 A1* | 1/2008 | Yoon | H04N 9/3164 |
| | | | 353/31 |
| 2009/0033876 A1 | 2/2009 | Shimaoka et al. | |
| 2009/0116214 A1* | 5/2009 | Phillips, III | G03B 21/2073 |
| | | | 362/230 |
| 2010/0165300 A1 | 7/2010 | Shimaoka et al. | |
| 2013/0113911 A1 | 5/2013 | Hanano et al. | |
| 2014/0285772 A1 | 9/2014 | Tajiri | |
| 2016/0357098 A1* | 12/2016 | Kang | G02B 3/0043 |
| 2017/0097560 A1 | 4/2017 | Matsubara et al. | |

FOREIGN PATENT DOCUMENTS

| | | |
|---|---|---|
| JP | 2005157221 A | 6/2005 |
| JP | 2005-250059 | 9/2005 |
| JP | 2007-047799 | 2/2007 |
| JP | 2007-163597 | 6/2007 |
| JP | 2010-054767 | 3/2010 |
| JP | 2012-049226 | 3/2012 |
| JP | 2012049226 A * | 3/2012 |
| JP | 2014123140 A * | 7/2014 |
| JP | 2014-186115 | 10/2014 |
| JP | 2018-124494 | 8/2018 |
| WO | WO 2007/015389 | 2/2007 |
| WO | WO 2007/083678 | 7/2007 |
| WO | WO 2012/101904 | 8/2012 |
| WO | WO-2015151171 A1 | 10/2015 |
| WO | WO 2018/011893 | 1/2018 |

OTHER PUBLICATIONS

Extended European Search Report for Europe Patent Application No. 19908920, dated Feb. 8, 2022, 8 pages.

* cited by examiner

LIGHT SOURCE DEVICE AND IMAGE DISPLAY DEVICE

CROSS REFERENCE TO RELATED APPLICATIONS

This application is a national stage application under 35 U.S.C. 371 and claims the benefit of PCT Application No. PCT/JP2019/047571 having an international filing date of 5 Dec. 2019, which designated the United States, which PCT application claimed the benefit of Japanese Patent Application No. 2019-000653 filed 7 Jan. 2019, the entire disclosures of each of which are incorporated herein by reference.

TECHNICAL FIELD

The present technology relates to a light source device and an image display device.

BACKGROUND ART

It is desirable that an image display device can display a standardized color gamut such as sRGB in order to display a video having excellent color reproducibility. In order to display the standardized color gamut, it is desirable that the light source device included in the image display device emits a light in a narrow wavelength range of each of a red wavelength range, a green wavelength range, and a blue wavelength range. However, since a light in such a narrow wavelength range has high coherence, speckle noise occurs in which glaring spots are generated on the surface of an irradiated object.

Therefore, as in Patent Document 1, a technique for reducing the speckle noise has been proposed by combining a light in a narrow wavelength range with a light in a wide wavelength range.

Patent Document 1 discloses a light source device including a first light source that emits a light in a first wavelength range that is blue, a second light source that emits a light in a second wavelength range that is red, a wavelength conversion unit that includes a phosphor material and converts a part of the emitted light in the first wavelength range into a fluorescent emission light in a different wavelength range and emits the converted light, and a combiner that is a dichroic mirror that has wavelength selectivity for a specific wavelength range corresponding to the second wavelength range and has a characteristic of filtering a part of the second wavelength range corresponding to a wavelength emitted by the second light source among the fluorescent emission lights, and combines the incident light in the first wavelength range from the first light source, the light in the second wavelength range from the second light source, and the filtered fluorescent emission light, in which the light in the second wavelength range from the second light source reinforces the filtered fluorescent emission light in a filtered wavelength band. Patent Document 1 describes a light source device having high efficiency and excellent color reproducibility by using a mixture of phosphors having individual emission spectra.

Patent Document 2 discloses a projection type image display device including a first light source in which a plurality of light emitting elements is linearly arranged, a second light source having a different form from the first light source, a scanning means that scans a light emitted from the first light source in a direction orthogonal to an arrangement direction of the plurality of light emitting elements, a spatial light modulation element that modulates the lights emitted from the first light source and the second light source according to a video signal, and a projection optical system that projects modulated lights emitted from the spatial light modulation element onto a screen. Patent Document 2 describes a projection type image display device using a compact and highly efficient lighting device that has high color rendering properties by efficiently using an illumination light emitted from the first light source such as a lamp, and by further using the second light source such as a laser in combination in order to display a bright image with high color reproducibility.

Then, in Patent Document 1 and Patent Document 2, a dichroic mirror is used as the combiner. This dichroic mirror has a function of emitting only light in a predetermined wavelength range. Note that in addition to the dichroic mirror, a bandpass filter, a notch filter, or the like may also be used as the combiner.

CITATION LIST

Patent Document

Patent Document 1: Japanese Patent Application Laid-Open No. 2014-186115
Patent Document 2: Japanese Patent Application Laid-Open No. 2010-054767

SUMMARY OF THE INVENTION

Problems to be Solved by the Invention

The combiner has a thin-film optical characteristic such that when an incident angle of light incident on the combiner increases, the wavelength range of an emitted light shifts to a short wavelength side, that is, what is called a "blue shift" occurs. Accordingly, the combiner needs to be designed so that the wavelength range of the emitted light is wide, in order to be capable of emitting a light shifted to a short wavelength side.

In a case where the combiner combines a light in a wide wavelength range and a light in a narrow wavelength range and the incident angle of at least one of the lights is large, the combiner needs to be designed to have a wide wavelength range of the emitted light. However, in a case where the combiner that is designed to have the wide wavelength range of the emitted light combines lights, crosstalk between the light in the narrow wavelength range and the light in the wide wavelength range reduces the light in the wide wavelength range. Consequently, there is a problem that utilization efficiency of light decreases.

Therefore, it is a main object of the present technology to provide a light source device and an image display device that combine lights with high efficiency.

Solutions to Problems

The present technology provides a light source device including a first light source unit that emits a light in a first wavelength range, a first illumination optical system on which the light in the first wavelength range is incident and that emits a first illumination light, a second light source unit that emits a light in a second wavelength range, a second illumination optical system on which the light in the second wavelength range is incident and that emits a second illumination light, and a combiner on which the first illumination light and the second illumination light are incident, in which the combiner has a characteristic of filtering the first illumination light on the basis of a wavelength range and an incident angle of the first illumination light, and a characteristic of filtering the second illumination light on the basis of a wavelength range and an incident angle of the second illumination light, and angles at which the first illumination light and the second illumination light are incident on the combiner are each adjusted in such a way that the wavelength range of the first illumination light emitted from the combiner and the wavelength range of the second illumination light emitted from the combiner approach or overlap with each other.

The filtering characteristics that the combiner has can be to reflect the first illumination light and the second illumination light in a specific wavelength range, and transmit the first illumination light and the second illumination light in other wavelength ranges.

The combiner may be a dichroic mirror.

The first light source unit and/or the second light source unit can emit a light in one or more wavelength ranges.

The first light source unit and/or the second light source unit can emit a coherent light.

The coherent light may be a laser light.

One or more phase modulation units can be further included on which the first illumination light and/or the second illumination light is incident, that modulates a phase of the first illumination light and/or the second illumination light, and that emits the first illumination light and/or the second illumination light.

The first illumination optical system and/or the second illumination optical system can include an integrator optical system.

The first illumination optical system and/or the second illumination optical system can include a fly-eye lens.

The first illumination optical system and/or the second illumination optical system can include a rod integrator.

The combiner may be a polarizing beam splitter.

Moreover, the present technology provides an image display device including the light source device.

MODE FOR CARRYING OUT THE INVENTION

Hereinafter, a preferred mode for carrying out the present technology will be described with reference to the accompanying drawings. Note that the embodiments described below are representative embodiments of the present technology, and the scope of the present technology is not limited to these embodiments. Note that the present technology will be described in the following order.

1. First embodiment (light source device) according to present technology

2. Second embodiment (image display device) according to present technology

3. Third embodiment (phase modulation unit) according to present technology

4. Fourth embodiment (gap) according to present technology

Figure 1:
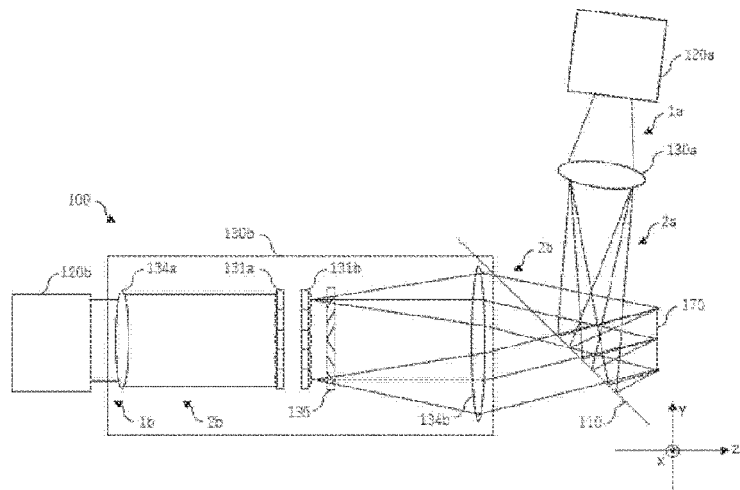
FIG. 1 is an overall configuration diagram of a light source device according to the present technology.

5. Fifth embodiment (plurality of monochromatic light sources) according to present technology 6. Sixth embodiment (rod integrator) according to present technology 7. Seventh embodiment (polarized light) according to present technology 1. First Embodiment (Light Source Device) According to Present Technology FIG. 1 illustrates an overall configuration diagram of a light source device according to the present technology. A light source device 100 according to the present technology includes a first light source unit 120a that emits a light 1a in a first wavelength range, a first illumination optical system 130a on which the light 1a in the first wavelength range is incident and that emits a first illumination light 2a, a second light source unit 120b that emits a light 1b in a second wavelength range, a second illumination optical system 130b on which the light 1b in the second wavelength range is incident and that emits a second illumination light 2b, and a combiner 110 on which the first illumination light 2a and the second illumination light 2b are incident.

<Combiner>

The combiner 110 has a characteristic of filtering the first illumination light 2a on the basis of a wavelength range and an incident angle of the first illumination light 2a. Moreover, the combiner 110 has a characteristic of filtering the second illumination light 2b on the basis of a wavelength range and an incident angle of the second illumination light 2b.

Moreover, in the light source device 100 according to the present technology, as described above, the angles at which the first illumination light 2a and the second illumination light 2b are incident on the combiner 110 are each adjusted in such a way that the wavelength range of the first illumination light 2a emitted from the combiner 110 and the wavelength range of the second illumination light 2b emitted from the combiner 110 approach or overlap each other.

The filtering characteristics that the combiner 110 has are to reflect illumination lights in a specific wavelength range and transmit illumination lights in other wavelength ranges. In the embodiment illustrated in FIG. 1, the combiner 110 reflects the first illumination light 2a in a specific wavelength range and transmits the second illumination light 2b in a specific wavelength range, to thereby combine the first illumination light 2a and the second illumination light 2b and emit the combined lights to a light emitting port 170.

It is desirable to use a dichroic mirror as the combiner 110. The dichroic mirror has a characteristic of reflecting an illumination light in a specific wavelength range and transmitting illumination lights in other wavelength ranges. Alternatively, as the combiner 110, a filter such as a bandpass filter or a notch filter can also be used.

The light source device 100 can include a plurality of combiners 110. Illumination lights that the plurality of combiners 110 has combined may be further combined by the combiner 110.

Figure 2:
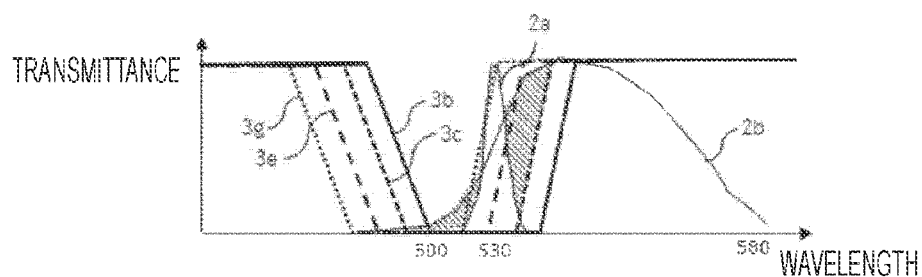
FIG. 2 illustrates transmittance characteristics of a combiner according to the present technology.

FIG. 2 illustrates transmittance characteristics of the combiner 110 according to the present technology. In FIG. 2, a horizontal axis is the wavelength of light, and indicates that the wavelength becomes longer toward the right. The vertical axis is the transmittance of light of the combiner 110, and the transmittance becomes higher toward the top. The combiner 110 has a characteristic of transmitting a light in a wavelength range having a high transmittance and reflecting a light in a wavelength range having a low transmittance.

As illustrated in FIG. 2, the transmittance of light of the combiner 110 changes according to the incident angle of light on the combiner 110. A transmittance characteristic 3b with an incident angle of light of 25 deg, a transmittance characteristic 3c with an incident angle of light of 35 deg, a transmittance characteristic 3e with an incident angle of light of 45 deg, and a transmittance characteristic 3g with an incident angle of light of 55 deg are illustrated.

The first illumination light 2a in a narrow wavelength range has a wavelength range of approximately 530 nm and an incident angle of 30 deg±5 deg. The second illumination light 2b in a wide wavelength range has a wavelength range of approximately 500 to 580 nm and an incident angle of 45 deg±10 deg. Note that the wavelength range of the first illumination light 2a is not limited to approximately 530 nm, and the wavelength range of the second illumination light 2b is not limited to approximately 500 to 580 nm. Furthermore, the incident angle of the first illumination light 2a is not limited to 30 deg±5 deg, and the incident angle of the second illumination light 2b is not limited to 45 deg±10 deg. The same applies to the following embodiments.

In this case, the transmittance characteristic of the combiner 110 that reflects the first illumination light 2a is the transmittance characteristic 3b of the incident angle of light of 25 deg. The wavelength range of the first illumination light 2a emitted from the combiner 110 and the wavelength range of the second illumination light 2b emitted from the combiner 110 overlap. Since there are small lights (hatched portions) of wavelengths that do not overlap, reduction of the second illumination light 2b due to crosstalk is suppressed.

Moreover, since the wavelength range of the first illumination light 2a emitted from the combiner 110 and the wavelength range of the second illumination light 2b emitted from the combiner 110 overlap, speckle noise generated on the surface of the irradiated object is reduced.

Figure 3:
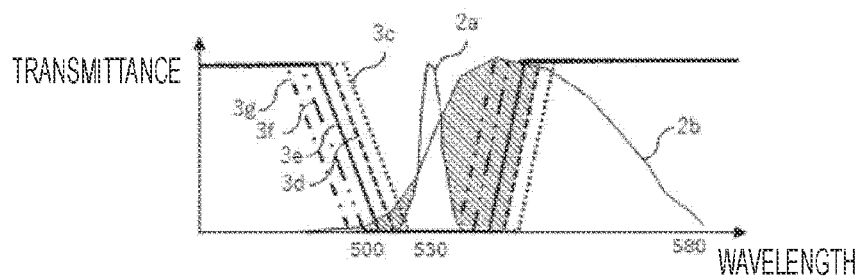
FIG. 3 is a reference diagram for explaining the transmittance characteristics of the combiner according to the present technology.

On the other hand, FIG. 3 illustrates transmittance characteristics of the combiner 110 in which the incident angle of light is not adjusted. FIG. 3 illustrates a transmittance characteristic 3c with an incident angle of light of 35 deg, a transmittance characteristic 3d with an incident angle of light of 40 deg, a transmittance characteristic 3e with an incident angle of light of 45 deg, a transmittance characteristic 3f with an incident angle of light of 50 deg, and a transmittance characteristic 3g with an incident angle of light of 55 deg.

The first illumination light 2a in a narrow wavelength range has a wavelength range of approximately 530 nm and an incident angle of 45 deg±5 deg. The second illumination light 2b in a wide wavelength range has a wavelength range of approximately 500 to 580 nm and an incident angle of 45 deg±10 deg.

In this case, most of the second illumination light 2b (hatched portion) does not overlap with the first illumination light 2a. The light in this hatched area is reduced by crosstalk. Consequently, the utilization efficiency of light is significantly reduced.

The present technology achieves the effect of combining the illumination light (2a, 2b) with high efficiency by adjusting the angle at which the illumination light (2a, 2b) is incident on the combiner 110. Thus, the present technology can combine lights with a simpler configuration than the prior art. Consequently, the present technology can contribute to the high degree of freedom of the illumination optical system (130a, 130b) and miniaturization of the light source device 100.

Furthermore, in a case where one combiner 110 combines a plurality of illumination lights (2a, 2b), it is necessary to design the combiner 110 with an increased total number of films, in order to suppress what is called a blue shift due to a thin film optical characteristic of the combiner 110. Thus, the thin film design becomes complicated, and manufacturability of the combiner 110 is significantly lowered. Moreover, as the total number of films increases, the illumination light (2a, 2b) is scattered, and thus utilization efficiency of the illumination light (2a, 2b) decreases.

On the other hand, the combiner 110 according to the present technology does not need to increase the total number of films, and thus manufacturability of the combiner 110 is improved. Moreover, reduction in total number of films suppresses scattering of the illumination light (2a, 2b), and consequently, the utilization efficiency of the illumination light (2a, 2b) is improved.

<Light Source Unit>

Let us return to the description of FIG. 1. The first light source unit 120a and/or the second light source unit 120b emits a light (1a, 1b) in one or more wavelength ranges. For example, the first light source unit 120a can emit a blue light, a red light, a white light, or the like in addition to a green light.

The first light source unit 120a and/or the second light source unit 120b can include a solid state light source (not illustrated). Examples of the solid state light source include semiconductor lasers, semiconductor diodes, and the like.

The solid state light source preferably emits a coherent light. Moreover, it is desirable that the solid state light source is a laser light. By using the coherent light or even the laser light source, the light source device 100 can have increased color reproducibility.

The solid state light source may be a single light source, may be arrayed, or may be stacked.

Figure 4:
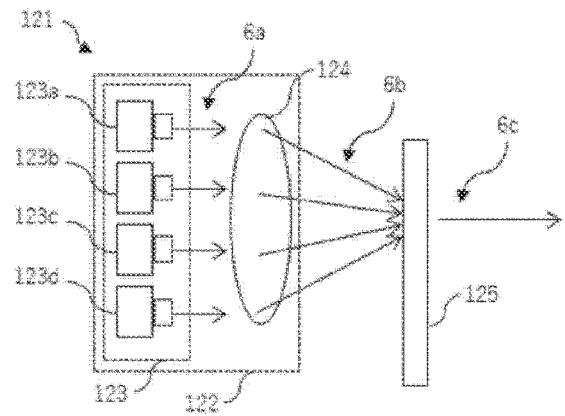
FIG. 4 is a configuration diagram of a solid state light source according to the present technology.

FIG. 4 illustrates a configuration diagram of one embodiment of a solid state light source. As illustrated in FIG. 4, the solid state light source 121 can include an excitation light source 122 and a wavelength conversion material 125.

The excitation light source 122 can have an array light source 123 in which a plurality of light sources (123a to 123d) is arranged in an array, and an excitation optical system 124 that collects a light 6a emitted from the array light source 123 and emits a light 6b. The excitation light source 122 may include, for example, a semiconductor laser, a discharge lamp, or the like. Furthermore, the wavelength range of the light 6b emitted by the excitation light source 122 and the wavelength range of a light 6c emitted by the wavelength conversion material 125 may be different.

Note that in FIG. 4, the number of light sources (123a to 123d) included in the array light source 123 is four, but it goes without saying that the number is not limited to four. Furthermore, the light sources (123a to 123d) may be arrayed as illustrated in FIG. 4, or may be a single light source. Alternatively, the light sources (123a to 123d) may be stacked.

The wavelength conversion material 125 can convert a wavelength in a narrow band. Quantum dots (QD) and the like are examples of the wavelength conversion material 125. For example, when the array light source 123 emits a laser light to the quantum dots, nanocrystals of the quantum dots function as a fine laser, and the wavelength can be converted with high efficiency.

Furthermore, in the embodiment illustrated in FIG. 1, the second light source unit 120b that emits the light 1b in a wide wavelength range may use a phosphor material as the wavelength conversion material 125 in FIG. 4.

<Illumination Optical System>

Let us return to the description of FIG. 1. The first illumination optical system 130a guides the light 1a in the first wavelength range emitted from the first light source unit 120a to the combiner 110. The second illumination optical system 130b guides the light 1b in the second wavelength range emitted from the second light source unit 120b to the combiner 110. The first illumination optical system 130a and/or the second illumination optical system 130b can form two or more optical paths by branching an optical path or the like.

The first illumination optical system 130a and/or the second illumination optical system 130b can include an integrator optical system. The first illumination optical system 130a and/or the second illumination optical system 130b can include at least one or more lenses (134a, 134b, or the like). Moreover, a lens included in the first illumination optical system 130a and a lens included in the second illumination optical system 130b may be combined.

Moreover, the first illumination optical system 130a and/or the second illumination optical system 130b can include a fly-eye lens. The integrator optical system may include, for example, a fly-eye lens. In the embodiment illustrated in FIG. 1, the second illumination optical system 130b includes a first fly-eye lens 131a and a second fly-eye lens 131b. By providing the fly-eye lenses (131a, 131b), the light source device 100 can make the irradiation surface have an even and uniform illuminance distribution.

Moreover, the first illumination optical system 130a and/or the second illumination optical system 130b can include a polarization conversion element 135.

The first illumination optical system 130a and/or the second illumination optical system 130b can further include a color separator (not illustrated). The color separator has a characteristic of filtering a color of light. Filtering characteristics of the color separator can be, for example, to reflect illumination lights in a specific wavelength range and transmit illumination lights in other wavelength ranges. The color separator separates, for example, a white light emitted from a light source unit into a red, green, or blue light. A dichroic mirror is an example of a color separator. Alternatively, a filter such as a bandpass filter or a notch filter may be used for the color separator.

Note that in the present embodiment, the first illumination light 2a is a light in a narrow wavelength range, and the second illumination light 2b is a light in a wide wavelength range. On the other hand, the embodiment may be such that the second illumination light 2b is a light in a narrow wavelength range, and the first illumination light 2a is a light in a wide wavelength range.

2. Second Embodiment (Image Display Device) According to Present Technology

Figure 5:
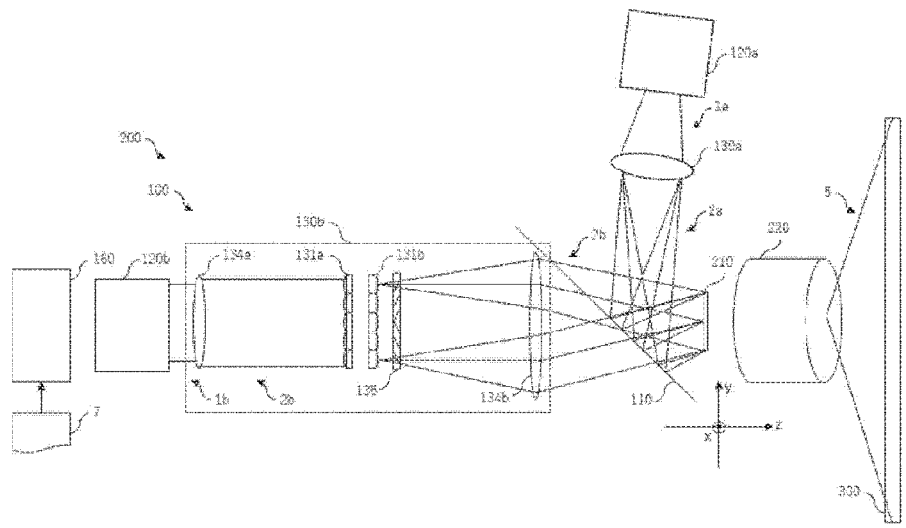
FIG. 5 is an overall configuration diagram of an image display device according to the present technology.

The light source device 100 according to the present technology may be provided in an image display device such as a projector. FIG. 5 illustrates an overall configuration diagram of one embodiment of an image display device according to the present technology.

As illustrated in FIG. 5, an image display device 200 can include at least a light source device 100, a spatial light modulation unit 210, a projection lens 220, and a control unit 160.

<Spatial Light Modulation Unit>

The spatial light modulation unit 210 modulates the illumination light (2a, 2b) according to a video signal 7. For example, the spatial light modulation unit 210 can adjust the amount of illumination light (2a, 2b) transmitted through the spatial light modulation unit 210. The image display device 200 can include a plurality of spatial light modulation units 210.

The spatial light modulation unit 210 can have a panel. For the panel included in the spatial light modulation unit 210, for example, a liquid crystal element can be used. By using the liquid crystal element, the spatial light modulation unit 210 can easily change a pattern of pixels. Note that the panel may be a transmissive type or a reflective type.

Alternatively, the spatial light modulation unit 210 may use, for example, a MEMS mirror. The MEMS mirror can change a mirror pattern at a higher speed than the liquid crystal element. An example of using a MEMS mirror for the spatial light modulation unit 210 is, for example, a digital micromirror device (DMD) or the like.

In a case where the spatial light modulation unit 210 is a MEMS mirror, the spatial light modulation unit 210 can consider the thin film optical characteristics of the combiner 110, and the wave can be combined regardless of whether a P-polarized light or an S-polarized light is incident on the combiner 110. For example, even in a case where the P-polarized light and the S-polarized light in which part or all of the wavelength ranges overlap are each incident on the combiner 110, the polarization separating element or the like changes the polarization of light, and thus the combiner 110 can combine a light in which part or all of the wavelength ranges overlap. By completely overlapping the wavelength ranges, the light source device 100 can further reduce speckle noise.

<Projection Lens>

The projection lens 220 projects the illumination light combined by the combiner 110 onto the screen 300 as a projected light 5.

Figure 6:
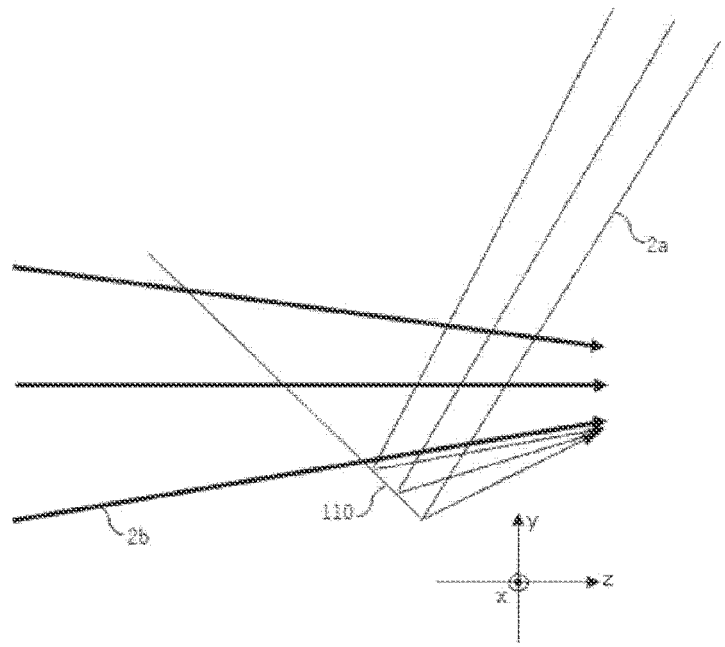
FIG. 6 illustrates how the combiner according to the present technology reflects and transmits an illumination light.

The illumination light incident on the projection lens 220 is a combination of the first illumination light 2a reflected or transmitted by the combiner 110 and the second illumination light 2b reflected or transmitted by the combiner 110. FIG. 6 illustrates an example of how the first illumination light 2a and the second illumination light 2b are combined.

As illustrated in FIG. 6, the combiner 110 transmits the second illumination light 2b in the wide wavelength range and reflects the first illumination light 2a in the narrow wavelength range. At this time, an angle component of the illumination light incident on the projection lens 220 is an angle component of the first illumination light 2a plus an angle component of the second illumination light 2b.

Figure 7:
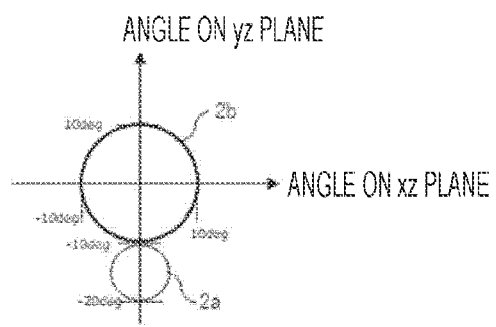
FIG. 7 illustrates angular distributions of illumination lights according to the present technology.

FIG. 7 illustrates an example of angular distributions of the first illumination light 2a and the second illumination light 2b incident on the projection lens 220. In FIG. 7, the horizontal axis indicates an angle at which an illumination light is incident on an xz plane. The xz plane is a plane substantially parallel to an optical path of the second illumination light 2b and a floor surface, assuming that the optical path of the second illumination light 2b is substantially parallel to the floor surface in FIG. 1. On the other hand, in FIG. 7, the vertical axis indicates an angle at which an illumination light is incident on a yz plane. The yz plane is a plane substantially parallel to an optical path of the second illumination light 2b and substantially perpendicular to the floor surface, assuming that the optical path of the second illumination light 2b is substantially parallel to the floor surface in FIG. 1.

As illustrated in FIG. 7, the angular distribution of the first illumination light 2a is arranged outside the angular distribution of the second illumination light 2b. Thus, in the design of the projection lens 220, it is desirable that the projection lens 220 is designed so that not only the second illumination light 2b but also the first illumination light 2a can be transmitted. Although a large design change is required to change the F value of the projection lens 220, it is easy to change the design so as to further transmit a light of part of angle components. Note that the F value is a value obtained by dividing the focal length of the projection lens 220 by the aperture. The smaller the F value, the more the projection lens 220 can take in light with a larger incident angle.

Figure 8:
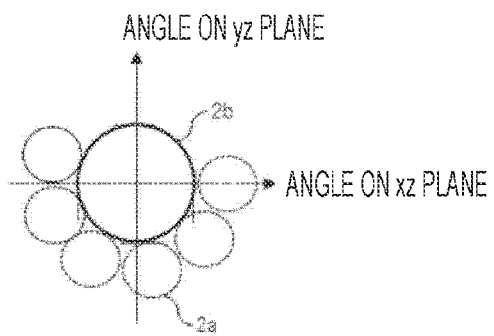
FIG. 8 illustrates angular distributions of illumination lights according to the present technology.

FIG. 8 illustrates another example of angular distributions of the first illumination light 2a and the second illumination light 2b incident on the projection lens 220. As illustrated in FIG. 8, the first illumination light 2a is incident on the projection lens 220 at various angles. As illustrated in FIG. 8, the projection lens 220 is preferably designed so as to be able to take in lights having various angular distributions.

<Control Unit>

Let us return to the description of FIG. 5. The control unit 160 can control operations of the above-described components according to the video signal 7. For example, the control unit 160 can adjust the amount of illumination light emitted by the second light source unit 120b, or change a rewriting pattern of the panel of the spatial light modulation unit 210.

3. Third Embodiment (Phase Modulation Unit) According to Present Technology

The first illumination optical system 130a and/or the second illumination optical system 130b included in the light source device 100 can further include one or more phase modulation units that modulate phases of the first illumination light 2a and/or the second illumination light 2b.

Figure 9:
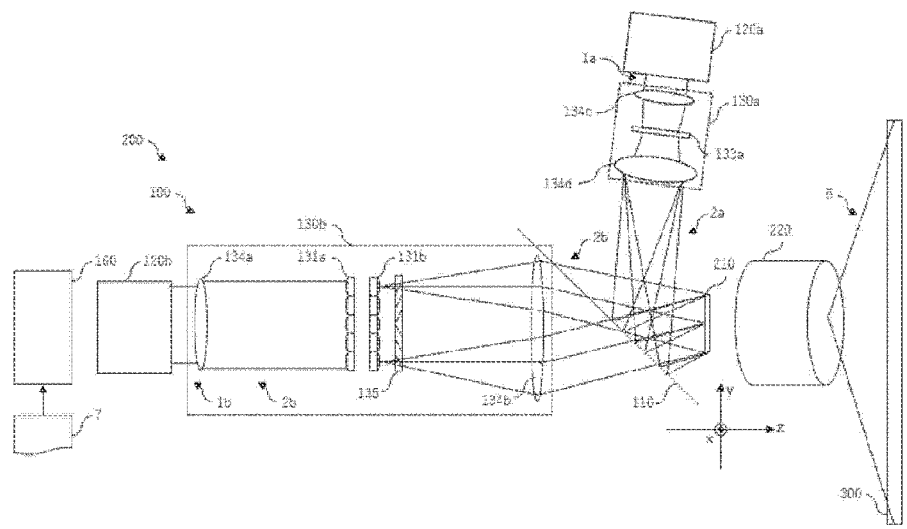
FIG. 9 is an overall configuration diagram of an image display device according to the present technology.

FIG. 9 illustrates an overall configuration diagram of one embodiment of the image display device 200 according to the present technology. As illustrated in FIG. 9, the first illumination optical system 130a includes a phase modulation unit 133a for the first light source. The phase modulation unit 133a for the first light source can perform phase modulation of at least 2π or more.

The phase modulation unit 133a for the first light source can include a panel. For the panel included in the phase modulation unit 133a for the first light source, for example, a liquid crystal element can be used. By using the liquid crystal element, the phase modulation unit 133a for the first light source can easily change a pattern of pixels. Note that the panel may be a transmissive type or a reflective type.

Alternatively, the phase modulation unit 133a for the first light source may use, for example, a MEMS mirror. The MEMS mirror can change a mirror pattern at a higher speed than the liquid crystal element. An example of using the MEMS mirror for the phase modulation unit 133a for the first light source is, for example, a digital micromirror device (DMD) or the like.

By modulating the phase of the first illumination light 2a by the phase modulation unit 133a for the first light source, the first illumination light 2a corresponding to the video signal 7 can be generated, and light in a dark portion in the image can be collected in a bright portion. Thus, the light source device 100 can have an increased peak brightness of the first illumination light 2a. Consequently, the image display device 200 including the light source device 100 can display an image having a wider dynamic range (high dynamic range).

At this time, an angle component of the illumination light (2a, 2b) emitted by the combiner 110 is an angle component of the second illumination light 2b plus an angle component of the first illumination light 2a. The angular distribution of the first illumination light 2a is arranged outside the angular distribution of the second illumination light 2b. In general, an image projected from the outside of a projection lens tends to have a deteriorated resolution. However, in the present technology, since the phase modulation unit increases the brightness peak, the brightness of an image outside the projection lens 220 becomes excessively high. Consequently, a lens flare occurs and the sense of resolution is weakened. That is, it can be said that phase modulation has a higher affinity than wavelength modulation for expanding the color gamut.

Furthermore, in the prior art, combination of lights is achieved by cutting lights in wide wavelength ranges which are standard dynamic ranges. On the other hand, the present technology can combine lights in the wide wavelength ranges with high efficiency. Moreover, since the wavelength ranges of lights to be combined overlap, the reduction effect of speckle noise can be expected to be improved.

Figure 10:
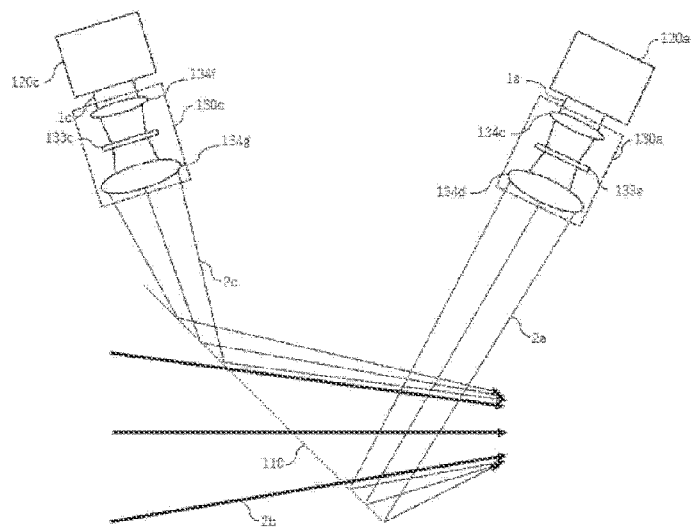
FIG. 10 illustrates how the combiner according to the present technology reflects and transmits an illumination light.

By the way, the light source device 100 may include a plurality of illumination optical systems including a phase modulation unit. FIG. 10 illustrates how a plurality of phase-modulated illumination lights is incident on the combiner 110.

As illustrated in FIG. 10, the first illumination optical system 130a includes at least the phase modulation unit 133a for the first light source and lenses (134c, 134d). The third illumination optical system 130c includes at least a phase modulation unit 133c for a third light source and lenses (134f, 134g).

A light 1a in a narrow wavelength range is emitted from the first light source unit 120a to the first illumination optical system 130a. Because of including the phase modulation unit 133a for the first light source, the first illumination optical system 130a modulates the phase of the light 1a emitted from the first light source unit 120a to emit the first illumination light 2a.

Similarly, a light 1c in a narrow wavelength range is emitted from the third light source unit 120c to the third illumination optical system 130c. Because of including the phase modulation unit 133c for the third light source, the third illumination optical system 130c modulates the phase of the light 1c emitted from the third light source unit 120c to emit the third illumination light 2c.

The combiner 110 combines the first illumination light 2a and the third illumination light 2c in the narrow wavelength range with the second illumination light 2b in the wide wavelength range.

Note that among the components included in the image display device 200, the functions of other components are similar to those of the second embodiment, and thus detailed descriptions thereof will be omitted.

4. Fourth Embodiment (Gap) According to Present Technology

In the light source device 100 according to the present technology illustrated in FIG. 5, a gap (interval) may be provided between the angle at which the first illumination light 2a is incident on the combiner 110 and the angle at which the second illumination light 2b is incident on the combiner 110. By providing the gap, the light source device 100 can completely overlap the wavelength range of the first illumination light 2a emitted from the combiner 110 and the wavelength range of the second illumination light 2b emitted from the combiner 110. Consequently, the light source device 100 can further reduce crosstalk. In addition to this, speckle noise can be further reduced.

Figure 11:
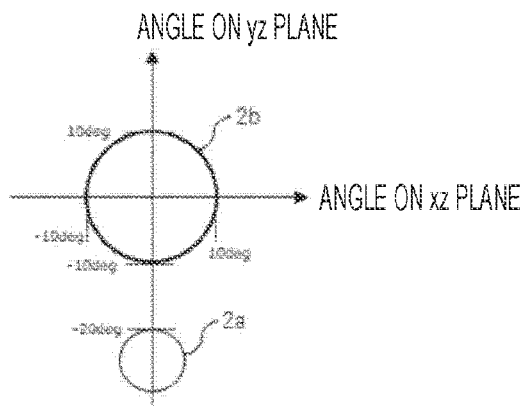
FIG. 11 illustrates angular distributions of illumination lights according to the present technology.

FIG. 11 illustrates an example of angular distributions of the first illumination light 2a and the second illumination light 2b emitted from the combiner 110. In FIG. 11, the horizontal axis indicates an angle at which the illumination light is incident on the xz plane, and the vertical axis indicates an angle at which the illumination light is incident on the yz plane. As illustrated in FIG. 11, a gap is provided between the angular distribution of the first illumination light 2a and the angular distribution of the second illumination light 2b.

Figure 12:
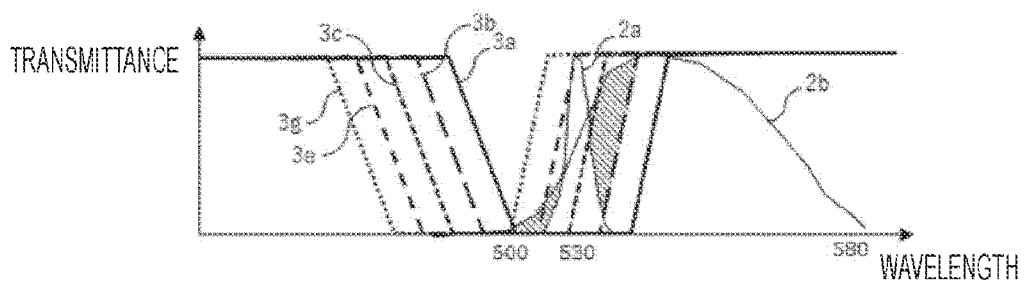
FIG. 12 illustrates transmittance characteristics of the combiner according to the present technology.

Transmittance characteristics of the combiner 110 at this time are illustrated in FIG. 12. FIG. 12 illustrates a transmittance characteristic 3a with an incident angle of light of 15 deg, a transmittance characteristic 3b with an incident angle of light of 25 deg, a transmittance characteristic 3c with an incident angle of light of 35 deg, a transmittance characteristic 3e with an incident angle of light of 45 deg, and a transmittance characteristic 3g with an incident angle of light of 55 deg.

The first illumination light 2a in a narrow wavelength range has a wavelength of approximately 530 nm and an incident angle of 20 deg±5 deg. The second illumination light 2b in a wide wavelength range has a wavelength of approximately 500 to 580 nm and an incident angle of 45 deg±10 deg.

Note that the phase modulation unit illustrated in the third embodiment can also be used in the present embodiment. Therefore, at least one of the first illumination light 2a or the second illumination light 2b may be an illumination light having a high dynamic range with increased peak brightness.

5. Fifth Embodiment (Plurality of Monochromatic Light Sources) According to Present Technology The light source device 100 according to the present technology can include at least three or more light source units. Moreover, the light source device 100 can be provided with at least two or more light source units, or even three or more light source units, which emit light in different narrow wavelength ranges. Furthermore, at least one light source unit may emit illumination light having a high dynamic range with increased peak brightness by including a phase modulation unit or the like.

The color gamut that can be displayed by the light source device 100 is increased by providing a plurality of light source units that emits lights having wavelengths in different narrow wavelength ranges from each other. Consequently, color expression of the light source device 100 is improved.

Figure 13:
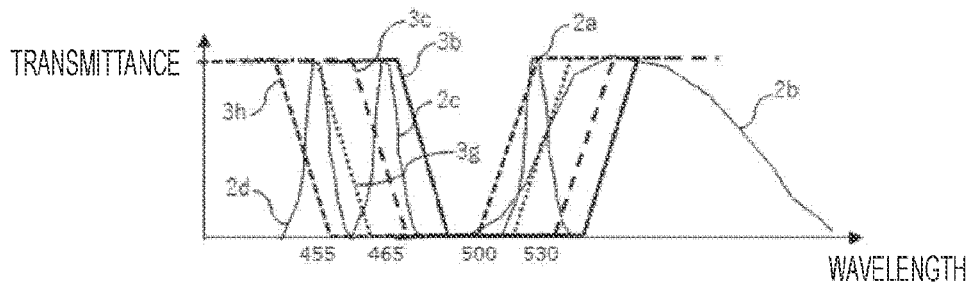
FIG. 13 illustrates transmittance characteristics of the combiner according to the present technology.

FIG. 13 illustrates an example of transmittance characteristics of the combiner 110 that combines lights in different narrow wavelength ranges from each other. FIG. 13 illustrates a transmittance characteristic 3b with an incident angle of light of 25 deg, a transmittance characteristic 3c with an incident angle of light of 35 deg, a transmittance characteristic 3g with an incident angle of light of 55 deg, and a transmittance characteristic 3h with an incident angle of light of 65 deg.

The first illumination light 2a in the narrow wavelength range has a wavelength of approximately 530 nm and an incident angle of 30 deg±5 deg. The second illumination light 2b in the wide wavelength range has a wavelength of approximately 500 to 580 nm and an incident angle of 45 deg±10 deg. The third illumination light 2c, which has a narrow wavelength range and a high dynamic range, has a wavelength of approximately 465 nm and an incident angle of 60 deg±5 deg. The fourth illumination light 2d, which has a narrow wavelength range and a standard dynamic range, has a wavelength of approximately 455 nm and an incident angle of 45 deg±10 deg. The second illumination light 2b and the fourth illumination light 2d are incident on the combiner 110 at the same angle.

In this case, the transmittance characteristic of the combiner 110 that reflects the first illumination light 2a is the transmittance characteristic 3b of the incident angle of light of 25 deg. The transmittance characteristic of the combiner 110 that reflects the third illumination light 2c is the transmittance characteristic 3h of the incident angle of light of 65 deg.

At this time, the wavelength range of the third illumination light 2c and the wavelength range of the fourth illumination light 2d do not overlap, and crosstalk does not Occur. Furthermore, since the wavelength range of the second illumination light 2b and the wavelength range of the third illumination light 2c are completely different, crosstalk does not occur.

Angles at which the third illumination light 2c and the fourth illumination light 2d are incident on the combiner 110 are each adjusted in such a way that the wavelength range of the third illumination light 2c emitted from the combiner 110 and the wavelength range of the fourth illumination light 2d emitted from the combiner 110 are close to each other.

Figure 14:
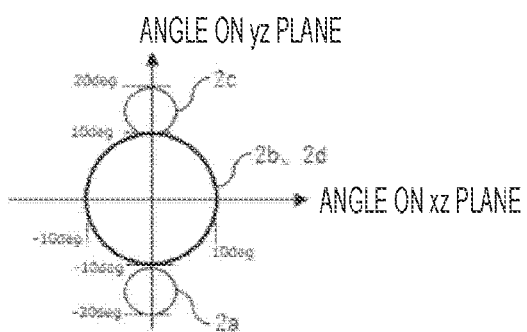
FIG. 14 illustrates angular distributions of illumination lights according to the present technology.

FIG. 14 illustrates an example of angular distributions of the first illumination light 2a, the second illumination light 2b, and the third illumination light 2c emitted by the combiner 110. In FIG. 14, the horizontal axis indicates an angle at which the illumination light is incident on the xz plane, and the vertical axis indicates an angle at which the illumination light is incident on the yz plane. The angular distributions of the first illumination light 2a and the third illumination light 2c are arranged outside the angular distribution of the second illumination light 2b.

6. Sixth Embodiment (Rod Integrator) According to Present Technology

The first illumination optical system 130a and/or the second illumination optical system 130b can include a rod integrator.

Figure 15:
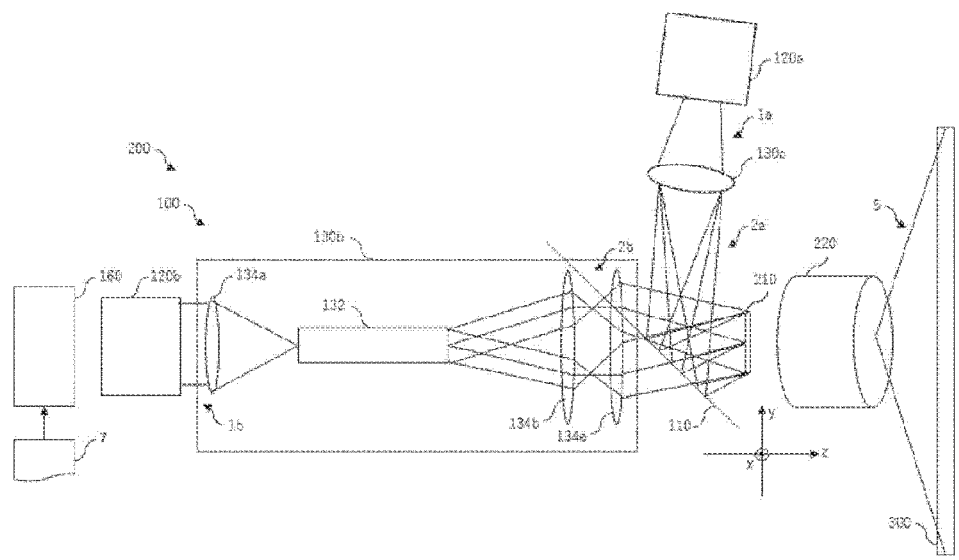
FIG. 15 is an overall configuration diagram of an image display device according to the present technology.

FIG. 15 illustrates an overall configuration diagram of one embodiment of an image display device 200 according to the present technology. For example, in a case where the spatial light modulation unit 210 is a MEMS mirror, the second illumination optical system 130b can include a rod integrator 132 and lenses (134a, 134b, 134e).

By reflecting the second illumination light 2b many times inside the rod integrator 132, the second illumination optical system 130b can make the irradiation surface have an even and uniform illuminance distribution.

Note that the phase modulation unit illustrated in the third embodiment can also be used in the present embodiment. Therefore, at least one of the first illumination light 2a or the second illumination light 2b may be an illumination light having a high dynamic range with increased peak brightness.

Note that among the components included in the image display device 200, the functions of other components are similar to those of the second embodiment, and thus detailed descriptions thereof will be omitted.

7. Seventh Embodiment (Polarized Light) According to Present Technology

A polarizing beam splitter can be used for the combiner. In a case where a polarizing beam splitter is used, the light emitted by the light source unit is an S-polarized light or a P-polarized light.

Figure 16:
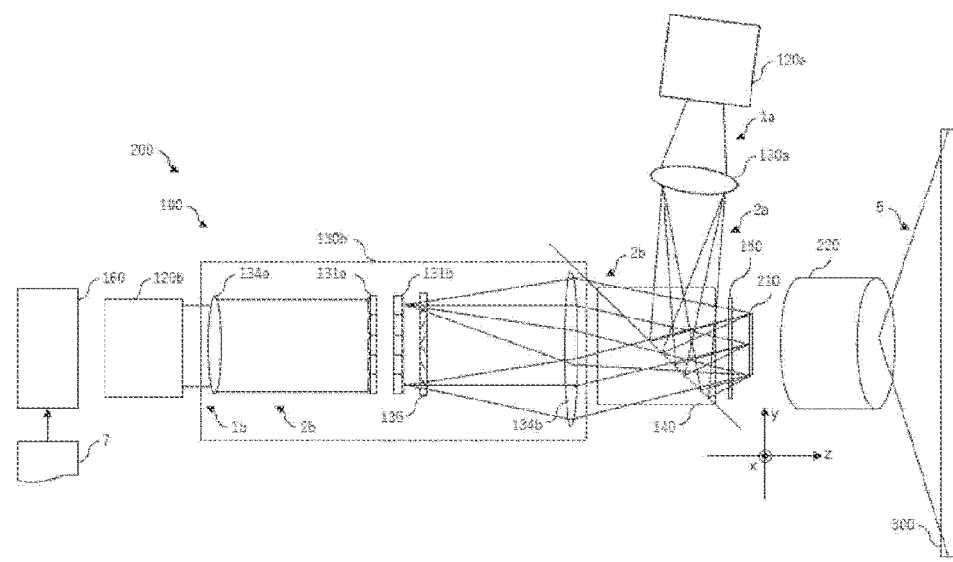
FIG. 16 is an overall configuration diagram of an image display device according to the present technology.

FIG. 16 illustrates an overall configuration diagram of one embodiment of the image display device 200 according to the present technology. As illustrated in FIG. 16, a polarizing beam splitter 140 is used as the combiner 110. Note that in the embodiment, a light 1a emitted by the first light source unit 120a is an S-polarized light, and a light 1b emitted by the second light source unit 120b is a P-polarized light.

Here, in a case where the spatial light modulation unit 210 is a panel using a liquid crystal, the light emitted by the first light source unit 120a and the light emitted by the second light source unit 120b need to be the same polarized lights. For that purpose, it is necessary to change the polarization of either of the light 1a emitted by the first light source unit 120a and the light 1b emitted by the second light source unit 120b.

For example, the light source device 100 can change the polarization of light by using a wavelength-selective retardation plate 150. As illustrated in FIG. 16, the light source device 100 includes the wavelength-selective retardation plate 150 between the spatial light modulation unit 210 and the projection lens 220.

Figure 17:
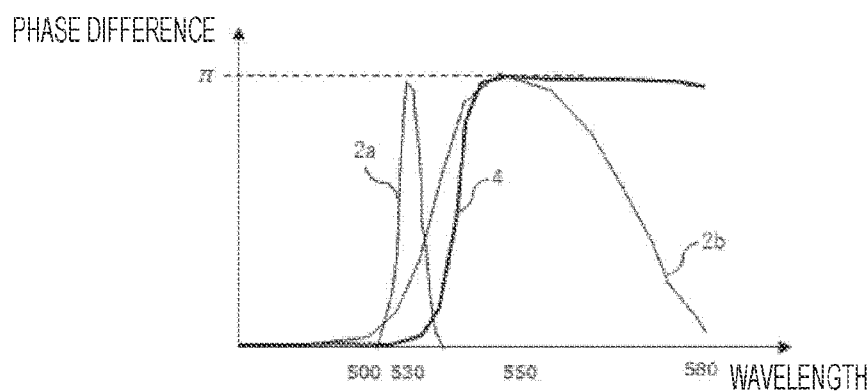
FIG. 17 is a diagram illustrating a relationship between a wavelength and a phase difference of illumination lights according to the present technology.

FIG. 17 illustrates a relationship between a wavelength and a phase difference of illumination lights (2a, 2b) incident on the spatial light modulation unit 210 via the wavelength-selective retardation plate 150. In FIG. 17, the horizontal axis is the wavelength of light, and it is illustrated that the wavelength becomes longer toward the right. The wavelength of the first illumination light 2a emitted by the first light source unit 120a is approximately 530 nm. The wavelength of the second illumination light 2b emitted by the second light source unit 120b is approximately 500 to 580 nm.

The vertical axis illustrates a phase difference between the first illumination light 2a and the second illumination light 2b. In a case where the wavelength of the illumination light (2a, 2b) is approximately 530 nm, the phase difference 4 is 0. As the wavelength becomes longer than approximately 530 nm, the phase difference 4 is generated more, and in a case where the wavelength is approximately 550 nm, the phase difference 4 becomes $\pi$, that is, $\lambda/2$.

In the light source device 100, the wavelength-selective retardation plate 150 having such characteristics is arranged so as to be inclined by 45 deg with respect to each of the first illumination light 2a and the second illumination light 2b. Consequently, a polarized light is inverted only at wavelengths with a phase difference of $\lambda/2$. In the present embodiment, the first illumination light 2a is an S-polarized light and the second illumination light 2b is a P-polarized light. When the phase difference of $\lambda/2$ is generated, the second illumination light 2b becomes an S-polarized light, and thus the first illumination light 2a and the second illumination light 2b become the same polarized lights.

Note that in a case where the spatial light modulation unit 210 is a panel using a mirror, the first illumination light 2a and the second illumination light 2b need not be the same polarized lights. Therefore, in this case, the light source device 100 does not have to include the wavelength-selective retardation plate 150 or the like.

Note that the phase modulation unit illustrated in the third embodiment can also be used in the present embodiment. Therefore, at least one of the first illumination light 2a or the second illumination light 2b may be an illumination light having a high dynamic range with increased peak brightness.

Note that among the components included in the image display device 200, the functions of other components are similar to those of the second embodiment, and thus detailed descriptions thereof will be omitted.

Note that the present technology can also employ the following configurations.

[1] A light source device including:

a first light source unit that emits a light in a first wavelength range;

a first illumination optical system on which the light in the first wavelength range is incident and that emits a first illumination light;

a second light source unit that emits a light in a second wavelength range;

a second illumination optical system on which the light in the second wavelength range is incident and that emits a second illumination light; and a combiner on which the first illumination light and the second illumination light are incident, in which the combiner has a characteristic of filtering the first illumination light on the basis of a wavelength range and an incident angle of the first illumination light, and a characteristic of filtering the second illumination light on the basis of a wavelength range and an incident angle of the second illumination light, and angles at which the first illumination light and the second illumination light are incident on the combiner are each adjusted in such a way that the wavelength range of the first illumination light emitted from the combiner and the wavelength range of the second illumination light emitted from the combiner approach or overlap with each other.

[2] The light source device according to [1], in which filtering characteristics that the combiner has are to reflect the first illumination light and the second illumination light in a specific wavelength range, and transmit the first illumination light and the second illumination light in other wavelength ranges.

[3] The light source device according to [1] or [2], in which the combiner is a dichroic mirror.

[4] The light source device according to any one of [1] to [3], in which the first light source unit and/or the second light source unit emits a light in one or more wavelength ranges.

[5] The light source device according to any one of [1] to [4], in which the first light source unit and/or the second light source unit emits a coherent light.

[6] The light source device according to [5], in which the coherent light is a laser light.

[7] The light source device according to any one of [1] to [6], further including one or more phase modulation units that modulate a phase of the first illumination light and/or the second illumination light.

[8] The light source device according to any one of [1] to [7], in which the first illumination optical system and/or the second illumination optical system includes an integrator optical system.

[9] The light source device according to any one of [1] to [8], in which the first illumination optical system and/or the second illumination optical system includes a fly-eye lens.

[10] The light source device according to any one of [1] to [9], in which the first illumination optical system and/or the second illumination optical system includes a rod integrator.

[11] The light source device according to any one of [1] to [10], in which the combiner is a polarizing beam splitter.

[12] An image display device including the light source device according to any one of [1] to [11].

REFERENCE SIGNS LIST

100 Light source device
110 Combiner
120a First light source unit
120b Second light source unit
120c Third light source unit
121 Solid state light source
122 Excitation light source
123 Array light source
123a Light source
123b Light source
123c Light source
123d Light source
124 Excitation optical system
125 Wavelength conversion material
130a First illumination optical system
130b Second illumination optical system
130c Third illumination optical system
131a First fly-eye lens
131b Second fly-eye lens
132 Rod integrator
133a Phase modulation unit for first light source
133c Phase modulation unit for third light source
134a Lens
134b Lens
134c Lens
134d Lens
134e Lens
134f Lens
134g Lens
135 Polarization conversion element
140 Polarizing beam splitter
150 Wavelength-selective retardation plate
160 Control unit
170 Light emitting port
200 Image display device
210 Spatial light modulation unit
220 Projection lens
300 Screen
1a Light in first wavelength range
1b Light in second wavelength range
2a First illumination light
2b Second illumination light
2c Third illumination light
2d Fourth illumination light
3a Transmittance characteristic of 15 deg
3b Transmittance characteristic of 25 deg
3c Transmittance characteristic of 35 deg
3d Transmittance characteristic of 40 deg
3e Transmittance characteristic of 45 deg
3f Transmittance characteristic of 50 deg
3g Transmittance characteristic of 55 deg
3h Transmittance characteristic of 65 deg
4 Phase difference
5 Projected light
6a Light
6b Light
6c Light
6d Light
7 Video signal

What is claimed is:

1. A light source device comprising:
a first light source unit that emits a light in a first wavelength range;
a first illumination optical system on which the light in the first wavelength range is incident and that emits a first illumination light;
a second light source unit that emits a light in a second wavelength range;
a second illumination optical system on which the light in the second wavelength range is incident and that emits a second illumination light;
a combiner on which the first illumination light and the second illumination light are incident,
wherein the combiner has a characteristic of filtering the first illumination light on a basis of a wavelength range and an incident angle of the first illumination light, and a characteristic of filtering the second illumination light on a basis of a wavelength range and an incident angle of the second illumination light,
wherein angles at which the first illumination light and the second illumination light are incident on the combiner are each adjusted in such a way that the wavelength range of the first illumination light emitted from the combiner and the wavelength range of the second illumination light emitted from the combiner approach or overlap with each other, and
wherein the combiner is a polarizing beam splitter; and
a wavelength-selective retardation plate provided inclined by 45 degrees with respect to each of the first and second illumination lights.

2. The light source device according to claim 1, wherein filtering characteristics that the combiner has are to reflect the first illumination light and the second illumination light in a specific wavelength range, and transmit the first illumination light and the second illumination light in other wavelength ranges.

3. The light source device according to claim 1, wherein at least one of the first light source unit and the second light source unit emits a light in one or more wavelength ranges.

4. The light source device according to claim 1, wherein the first light source unit emits an S-polarized light and the second light source unit emits a P-polarized light.

5. The light source device according to claim 1, wherein the first light source unit emits a P-polarized light and the second light source unit emits an S-polarized light.

6. The light source device according to claim 1, further comprising one or more phase modulation units that modulate a phase of at least one of the first illumination light and the second illumination light.

7. The light source device according to claim 1, wherein at least one of the first illumination optical system and the second illumination optical system includes an integrator optical system.

8. The light source device according to claim 1, wherein at least one of the first illumination optical system and the second illumination optical system includes a fly-eye lens.

9. The light source device according to claim 1, wherein at least one of the first illumination optical system and the second illumination optical system includes a rod integrator.

10. An image display device, comprising:
a light source device comprising:
a first light source unit that emits a light in a first wavelength range;
a first illumination optical system on which the light in the first wavelength range is incident and that emits a first illumination light;
a second light source unit that emits a light in a second wavelength range;
a second illumination optical system on which the light in the second wavelength range is incident and that emits a second illumination light;
a combiner on which the first illumination light and the second illumination light are incident,
wherein the combiner has a characteristic of filtering the first illumination light on a basis of a wavelength range and an incident angle of the first illumination light, and a characteristic of filtering the second illumination light on a basis of a wavelength range and an incident angle of the second illumination light,
wherein angles at which the first illumination light and the second illumination light are incident on the combiner are each adjusted in such a way that the wavelength range of the first illumination light emitted from the combiner and the wavelength range of the second illumination light emitted from the combiner approach or overlap with each other, and wherein the combiner is a polarizing beam splitter; and
a wavelength-selective retardation plate provided inclined by 45 degrees with respect to each of the first and second illumination lights;
a spatial light modulating unit that modulates the first illumination light and the second illumination light;
a projections lens that projects the modulated first and second illumination light onto a screen; and
a controller that controls operations of the light source device and the spatial light modulating unit.

11. The image display device according to claim 10, wherein filtering characteristics that the combiner has are to reflect the first illumination light and the second illumination light in a specific wavelength range, and transmit the first illumination light and the second illumination light in other wavelength ranges.

12. The image display device according to claim 10, wherein at least one of the first light source unit and the second light source unit emits a light in one or more wavelength ranges.

13. The image display device according to claim 10, wherein the first light source unit emits an S-polarized light and the second light source unit emits a P-polarized light.

14. The image display device according to claim 10, wherein the first light source unit emits a P-polarized light and the second light source unit emits an S-polarized light.

15. The image display device according to claim 10, further comprising one or more phase modulation units that modulate a phase of at least one of the first illumination light and the second illumination light.

16. The image display device according to claim 10, wherein at least one of the first illumination optical system and the second illumination optical system includes an integrator optical system.

17. The image display device according to claim 10, wherein at least one of the first illumination optical system and the second illumination optical system includes a fly-eye lens.

18. The image display device according to claim 10, wherein at least one of the first illumination optical system and the second illumination optical system includes a rod integrator.

19. The image display device according to claim 10, wherein the incident angle of the first illumination light is less than the incident angle of the second illumination light.

20. The light source device according to claim 1, wherein the incident angle of the first illumination light is less than the incident angle of the second illumination light.

* * * * *